United States Patent
Brückner et al.

(10) Patent No.: US 10,101,021 B2
(45) Date of Patent: Oct. 16, 2018

(54) CONTROL METHOD FOR OPERATING A HEAT RECOVERY STEAM GENERATOR

(71) Applicant: Siemens Aktiengesellschaft, Munich (DE)

(72) Inventors: Jan Brückner, Uttenreuth (DE); Frank Thomas, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/518,323

(22) PCT Filed: Oct. 29, 2015

(86) PCT No.: PCT/EP2015/075136
§ 371 (c)(1),
(2) Date: Apr. 11, 2017

(87) PCT Pub. No.: WO2016/071204
PCT Pub. Date: May 12, 2016

(65) Prior Publication Data
US 2017/0307207 A1    Oct. 26, 2017

(30) Foreign Application Priority Data
Nov. 6, 2014 (DE) .................. 10 2014 222 682

(51) Int. Cl.
*F22B 1/18* (2006.01)
*F22B 29/06* (2006.01)
(Continued)

(52) U.S. Cl.
CPC ............ *F22B 1/1807* (2013.01); *F22B 29/06* (2013.01); *F22B 35/10* (2013.01); *F22D 1/02* (2013.01)

(58) Field of Classification Search
CPC ........ F01K 23/101; F01K 23/108; F01K 7/24; F01K 13/02; F22D 7/00; F22B 35/10; F22B 35/108
See application file for complete search history.

(56) References Cited

U.S. PATENT DOCUMENTS 3,260,246 A    7/1966  Zwetz
4,031,404 A *  6/1977  Martz ................... F01K 23/108
                                                        122/479.1
(Continued)

FOREIGN PATENT DOCUMENTS

CN     1119554 C    8/2003
CN     102057218 A  5/2011
(Continued)

OTHER PUBLICATIONS

DE Search Report dated May 4, 2015, for DE patent application No. 102014222682.1.
(Continued)

*Primary Examiner* — Gregory A Wilson
(74) *Attorney, Agent, or Firm* — Beusse Wolter Sanks & Maire

(57) ABSTRACT

A control method for operating a heat recovery steam generator having a flue gas channel in which an evaporator, having at least two evaporator heating surfaces arranged successively in the flue gas channel and at least one intermediate heating surface arranged between the evaporator heating surfaces, is provided, the method including determining a characteristic value characteristic of the heat absorption in the evaporator for the evaporator heating surfaces, additionally determining for the at least one intermediate heating surface, an additional characteristic value for the heat absorption of the intermediate heating surface, and subtracting this additional characteristic value from the (Continued)

characteristic value characteristic of the heat absorption in the evaporator.

3 Claims, 3 Drawing Sheets

(51) Int. Cl.
*F22B 35/10* (2006.01)
*F22D 1/02* (2006.01)

(56) References Cited

U.S. PATENT DOCUMENTS

| | | | |
|---|---|---|---|
| 5,839,396 A | 11/1998 | Franke et al. | |
| 6,044,804 A | 4/2000 | Franke et al. | |
| 6,263,662 B1 * | 7/2001 | Nagashima | F01K 23/106 122/7 B |
| 9,568,216 B2 * | 2/2017 | Birnbaum | F22B 1/006 |
| 2005/0284346 A1 * | 12/2005 | Hayashi | F22B 35/18 110/343 |
| 2008/0066695 A1 | 3/2008 | Butterlin et al. | |
| 2008/0190382 A1 | 8/2008 | Brueckner et al. | |
| 2009/0044765 A1 | 2/2009 | Mussmann et al. | |
| 2010/0288210 A1 | 11/2010 | Brueckner et al. | |
| 2011/0023487 A1 | 2/2011 | Olia | |
| 2011/0139094 A1 | 6/2011 | Brueckner et al. | |
| 2013/0047938 A1 | 2/2013 | Brueckner et al. | |
| 2013/0192229 A1 | 8/2013 | Brueckner et al. | |
| 2014/0109547 A1 | 4/2014 | Brueckner et al. | |

FOREIGN PATENT DOCUMENTS

| | | |
|---|---|---|
| CN | 101379363 B | 6/2011 |
| CN | 103026136 A | 4/2013 |
| CN | 103249997 A | 8/2013 |
| DE | 102010042458 A1 | 4/2012 |
| DE | 102011004263 | 8/2012 |
| DE | 102011076968 A1 | 12/2012 |
| EP | 0848207 A2 | 6/1998 |
| EP | 2065641 A2 | 6/2009 |
| JP | S6446501 A | 2/1989 |
| JP | H06266408 A | 9/1994 |
| JP | H0988516 A | 3/1997 |
| JP | H09303113 A | 11/1997 |
| JP | H11350921 A | 12/1999 |
| JP | 2001193901 A | 7/2001 |
| JP | 2008530494 A | 8/2008 |
| JP | 2011174673 A | 9/2011 |
| JP | 2014105914 A | 6/2014 |
| WO | 2009068446 A2 | 6/2009 |
| WO | 2009150055 A2 | 12/2009 |

OTHER PUBLICATIONS

International Search Report dated Feb. 11, 2015, for PCT/EP2015/075136.

CN search report dated Jul. 9, 2018, for corresponding CN patent application No. 201580060498.3.

* cited by examiner

CONTROL METHOD FOR OPERATING A HEAT RECOVERY STEAM GENERATOR

CROSS REFERENCE TO RELATED APPLICATIONS

This application is the US National Stage of International Application No. PCT/EP2015/075136 filed Oct. 29, 2015, and claims the benefit thereof. The International Application claims the benefit of German Application No. DE 102014222682.1 filed Nov. 6, 2014. All of the applications are incorporated by reference herein in their entirety.

FIELD OF INVENTION

The invention relates to a control method for operating a once-through steam generator.

BACKGROUND OF INVENTION

Corresponding control methods for operating once-through steam generators, and in particular once-through steam generators which are configured as heat recovery steam generators, are known from WO 2009/068446 A2 and WO 2009/150055 A2. In the method described here, a setpoint value for the feed water mass flow rate to be adjusted will be specified for a once-through steam generator having an evaporator heating surface.

Particularly in vertical heat recovery steam generators, for thermodynamic optimization of the steam generator circuit, evaporators may be used which are separated into two or more evaporator heating surfaces in the flue gas channel because of at least one interposed intermediate heating surface not belonging to the evaporator. This means in practice that, in relation to its path from the evaporator inlet to the evaporator outlet, the flue gas must pass additional heating surfaces at which it is likewise cooled. The flue gas temperature is therefore reduced from the inlet to the outlet of the evaporator not exclusively only by the heat power transferred to a flowing fluid in the evaporator heating surfaces, but also by the heat power transferred in the intermediate heating surfaces. If, however, the predictive control of the feed water mass flow rate known from WO 2009/068446 A2 or WO 2009/150055 A2 is then used in such steam generator circuits with interposed intermediate heating surfaces, excessively high heat absorption is determined for the evaporator since the flue gas has also released heat to the interposed heating surfaces but this release of heat is not evaluated and taken into account. As a result, an excessively high setpoint value will thus be calculated for the feed water mass flow rate.

SUMMARY OF INVENTION

It is an object of the invention to provide a method which overcomes the disadvantage described above.

This object is achieved by the method for operating a once-through steam generator having the features of the independent claim.

Because the current heat absorption is determined for the at least one interposed intermediate heating surface and is subtracted from the balanced evaporator heat input of the evaporator heating surfaces of the evaporator, a value corrected by the heat absorption of the interposed intermediate heating surface is obtained for the control of the feed water mass flow rate, or the feed water quantity.

One advantageous configuration of the control method according to the invention consists in installing further flue gas temperature measuring devices in the flue gas channel at the inlet and outlet of the at least one interposed intermediate heating surface. Thus, the exact heat absorption of the at least one interposed intermediate heating surface can be determined at any time and adequately taken into account for the predictive control of the feed water mass flow rate. However, the outlay increases with each additionally installed flue gas temperature measuring device, several of which are still to be additionally installed for reasons of redundancy and in order to form a suitable average value. This outlay under certain circumstances moreover increases all the more when more intermediate heating surfaces are interposed on the flue gas side between the evaporator inlet and the evaporator outlet in order to optimize the thermodynamic design.

A particularly advantageous configuration of the control method of the invention consists in that, for determination of the heat absorption of the at least one interposed intermediate heating surface, balancing is sought on the steam side so that the comparatively cost-intensive equipment of the additional flue gas temperature measuring devices can be obviated as far as possible. In direct comparison, the measurements can be implemented more simply and more economically on the steam side. In principle, it is even conceivable that the interposed intermediate heating surfaces are already provided with the required measurements on the steam side for other reasons, so that these measurements may be employed.

BRIEF DESCRIPTION OF THE DRAWINGS

The invention will now be explained by way of example with the aid of the following figures, in which.

DETAILED DESCRIPTION OF INVENTION

Figure 1:
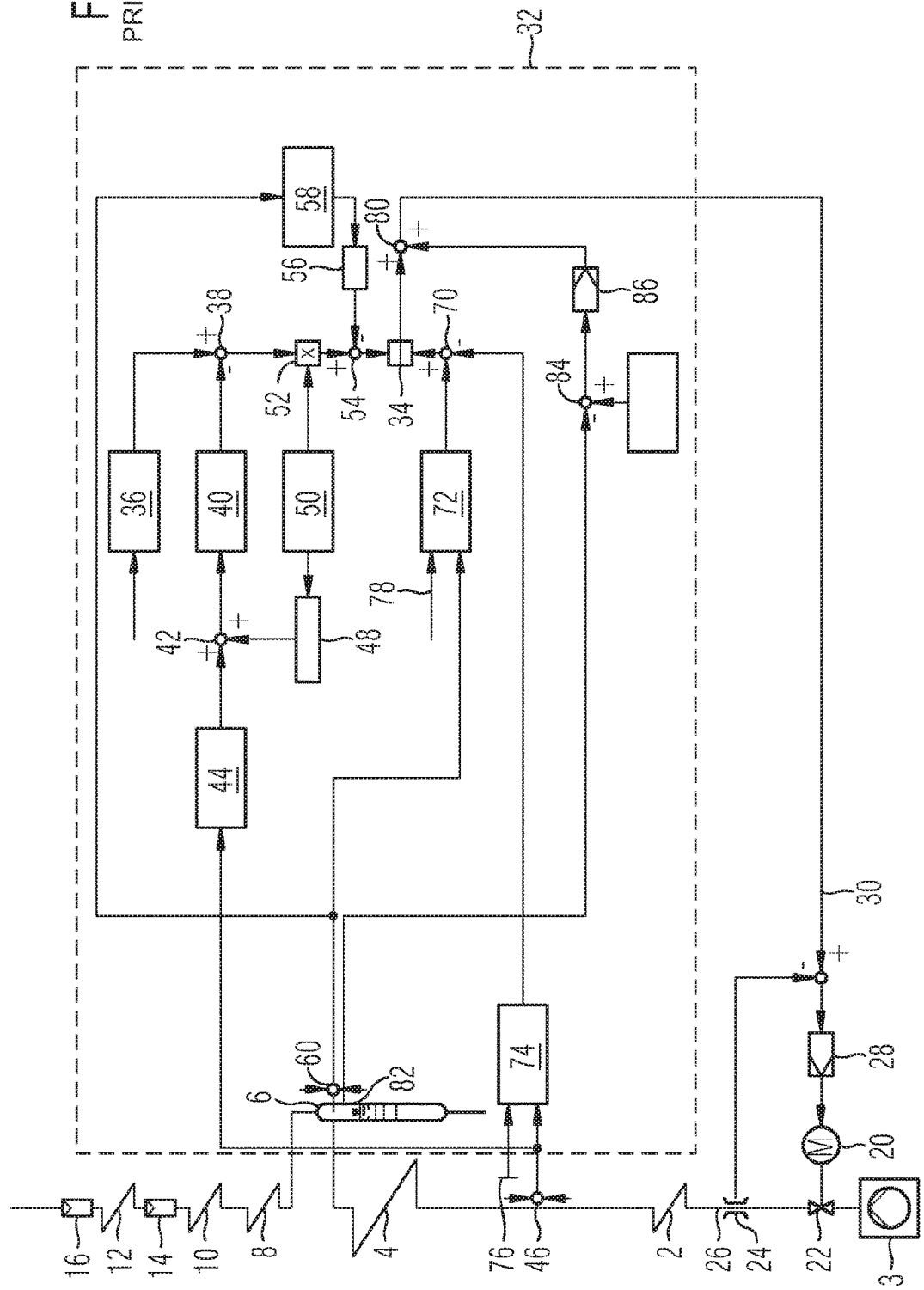
FIG. 1 schematically shows a control method known from the prior art.

FIG. 1 shows the control known from WO 2009/068446 A2. The heat recovery steam generator in this case comprises, in the flue gas channel (not represented in detail), a preheater 2, also referred to as an economizer, for feed water provided as a flow medium. The preheater 2 is preceded on the flow medium side by a feed water pump 3, and is followed by an evaporator heating surface 4. On the output side, the evaporator heating surface 4 is connected on the flow medium side via a water storage unit 6, which may in particular also be configured as a water separator or separating vessel, to a number of downstream superheater heating surfaces 8, 10, 12, which may in turn be provided with injection coolers 14, 16 in order to adapt the steam temperatures and the like. The heat recovery steam generator is configured for controlled reception of feed water. To this end, the feed water pump 3 is followed by a throttle valve 22 driven by a servomotor 20, so that, by suitable driving of the throttle valve 22, the feed water quantity, or the feed water mass flow rate, delivered in the direction of the preheater 2 by the feed water pump 3 can be adjusted and therefore controlled. In order to determine a current characteristic value for the feed water mass flow rate supplied, the throttle valve 22 is followed by a measuring device 24 for determining the feed water mass flow rate through the feed water line. The servomotor 20 is driven by means of a control element 28, which receives on the input side a setpoint value delivered via a data line 30 for the feed water mass flow rate, and the current actual value of the feed water mass flow rate as determined by means of a measuring device 24. By taking the difference between these two signals, a correction requirement is transmitted to the controller 28, so that corresponding correction of the throttle valve 22 is carried out via the driving of the motor 20 in the event of a difference between the actual and setpoint values.

In order to determine a particularly demand-oriented setpoint value for the feed water mass flow rate in the manner of predictive or forward-looking adjustment of the feed water mass flow rate, or adjustment oriented toward the future or current demand, the data line 30 is connected on the input side to a feed water flow control 32 configured for specifying the setpoint value for the feed water mass flow rate. This is configured in order to determine the setpoint value for the feed water mass flow rate with the aid of a heat flux balance in the evaporator heating surface 4, the setpoint value for the feed water mass flow rate being specified with the aid of the ratio of the heat flux currently transferred from the hot gas to the flow medium in the evaporator heating surface 4, on the one hand, and on the other hand a setpoint enthalpy increase of the flow medium in the evaporator heating surface 4, specified with respect to the desired fresh steam state. Use of such a concept of providing a setpoint value for the feed water mass flow rate on the basis of a heat balance itself for a heat recovery steam generator is achieved in the present exemplary embodiment particularly in that the heat flux transferred from the hot gas to the flow medium is determined while taking into account a temperature characteristic value characteristic of the current temperature of the hot gas at the evaporator inlet and a mass flow rate characteristic value characteristic of the current mass flow rate of the hot gas.

To this end, the feed water flow control 32 comprises a divider element 34, which is supplied as a numerator with a suitable characteristic value for the heat flux currently transferred from the hot gas to the flow medium in the evaporator heating surface 4, and as a denominator with a characteristic value suitably defined with respect to the desired fresh steam state for the desired setpoint enthalpy increase of the flow medium in the evaporator heating surface 4. On the numerator side, the divider element 34 is in this case connected on the input side to a functional module 36 which, with the aid of a supplied temperature characteristic value characteristic of the current temperature of the hot gas at the evaporator inlet as a starting value, emits a value for the enthalpy of the hot gas at the evaporator inlet. In the exemplary embodiment, the supply of a measurement value characteristic of the current temperature of the hot gas at the evaporator inlet as a temperature characteristic value is provided. The characteristic value characteristic of the enthalpy of the hot gas at the evaporator inlet is output to a subtractor element 38, where a characteristic value for the enthalpy of the gas at the outlet of the evaporator, delivered by a functional module 40, is subtracted from this characteristic value.

In order to determine the enthalpy of the hot gas at the evaporator outlet, the sum of two temperature values is formed for the functional element 40 on the input side by a summer element 42. In this case, on the one hand, the saturation temperature of the flow medium, determined with the aid of the pressure of the flow medium at the evaporator inlet by means of a functional element 44, which is connected on the input side to a pressure sensor 46, is taken into account. On the other hand, via a functional element 48 which is in turn supplied on the input side via a further functional element 50 with a mass flow rate characteristic value characteristic of the current mass flow rate of the hot gas, namely the temperature difference, determined from the mass flow rate of the hot gas, of the hot gas temperature at the evaporator outlet minus the boiling temperature of the flow medium at the evaporator inlet, is taken into account. From these two temperature contributions, which are added by means of the summer element 42, the enthalpy of the hot gas at the evaporator outlet is therefore provided by the functional component 40, optionally by resorting to suitable tables, diagrams or the like. On the outlet side, the subtractor element 38 therefore delivers the enthalpy difference, or enthalpy balance, of the hot gas, i.e. the difference between the hot gas enthalpy at the evaporator inlet and the hot gas enthalpy at the evaporator outlet.

This enthalpy difference is forwarded to a multiplier element 52, to which likewise the characteristic mass flow rate characteristic value, which may moreover be in the form of a currently recorded measurement value, is likewise applied. On the output side, the multiplier element 52 therefore delivers a characteristic value for the heat power released by the flue gas to the evaporator heating surface 4.

In order to be able to determine the heat flux actually transferred to the flow medium with the aid of this heat power released by the hot gas, a correction by heat absorption and/or release effects in the components of the evaporator heating surface 4, particularly in the metal masses, is initially also provided. To this end, the aforementioned characteristic value for the heat power released by the hot gas is initially supplied to a subtractor element 54, where a correction value characteristic of the heat absorption or release in the evaporator components is subtracted. This is provided by a functional element 56. The latter in turn receives on its input side the output value of a further functional element 58 by an average temperature value for the metal masses of the evaporator heating surface 4 being determined. To this end, the further functional element 58 is connected on the input side to a pressure transducer 60 arranged in the water storage unit 6, so that the further functional element 58 can determine the average temperature of the metal masses with the aid of the pressure of the flow medium, for example by setting it equal to the boiling temperature associated with this pressure, in the water storage unit 6.

On the output side, the subtractor element 54 therefore delivers a characteristic value characteristic for the heat power released by the hot gas, reduced by the heat power stored in the metal of the evaporator heating surface 4, and therefore for the heat power to be released to the flow medium in the evaporator 4.

This characteristic value is used as the numerator in the divider element 34, which is divided there by a denominator which corresponds to a setpoint enthalpy increase of the flow medium in the evaporator heating surface 4, specified with respect to the desired fresh steam state, so that the setpoint value for the feed water mass flow rate can be formed from this division or this ratio. In order to provide the denominator, i.e. the characteristic value for the desired setpoint enthalpy increase on the water/steam side, or flow medium side, the divider element 34 is connected on the input side to a subtractor element 70. The latter receives on the input side a characteristic value, provided by a functional element 72, for the desired setpoint value for the enthalpy of the flow medium at the evaporator outlet. Furthermore, the subtractor element 70 receives on the input side a characteristic value or actual value, provided by a functional module 74, for the current enthalpy of the flow medium at the evaporator inlet, which is subtracted in the subtractor element 70 from the aforementioned characteristic value for the setpoint value of the enthalpy at the evaporator outlet. On the input side, the functional module 74 is in this case connected to the pressure sensor 46 and to a temperature sensor 76 in order to form the aforementioned characteristic value for the actual enthalpy at the evaporator inlet. By taking the difference in the subtractor element 70, the enthalpy increase to be introduced into the flow medium in the evaporator heating surface 4 as a function of the desired fresh steam state is therefore determined, which may be used as the denominator in the divider element 34.

In the configuration according to FIG. 1, with the aid of the aforementioned division, the divider element 34 delivers on the output side a setpoint value for the feed water mass flow rate, which is oriented and determined with the aid of the aforementioned heat balance. This setpoint value is subsequently corrected once more in a downstream adder element 80 by a correction value, which in the present example reflects a change in the level in the water storage unit 6 desired via the feed water influx. To this end, the level in the water storage unit 6 is recorded by means of a filling level sensor 82. This actual value for the filling level is subtracted in a subtractor element 84 from a setpoint value, stored or predeterminable in another way, for the filling level in the water storage unit 6. With the aid of the difference thereby established between the actual level of the filling level in the water storage unit 6 and the assigned setpoint value, an effective feed water mass flow rate correction value is determined in a subsequent control element 86, which is intended to be used for a suitable filling level correction in the water storage unit 6. This correction value is added in the adder element 80 to the setpoint value, determined with the aid of the heat flux balance, for the feed water mass flow rate, so that a value composed of both components is output as a setpoint value for the feed water mass flow rate.

Figure 2:
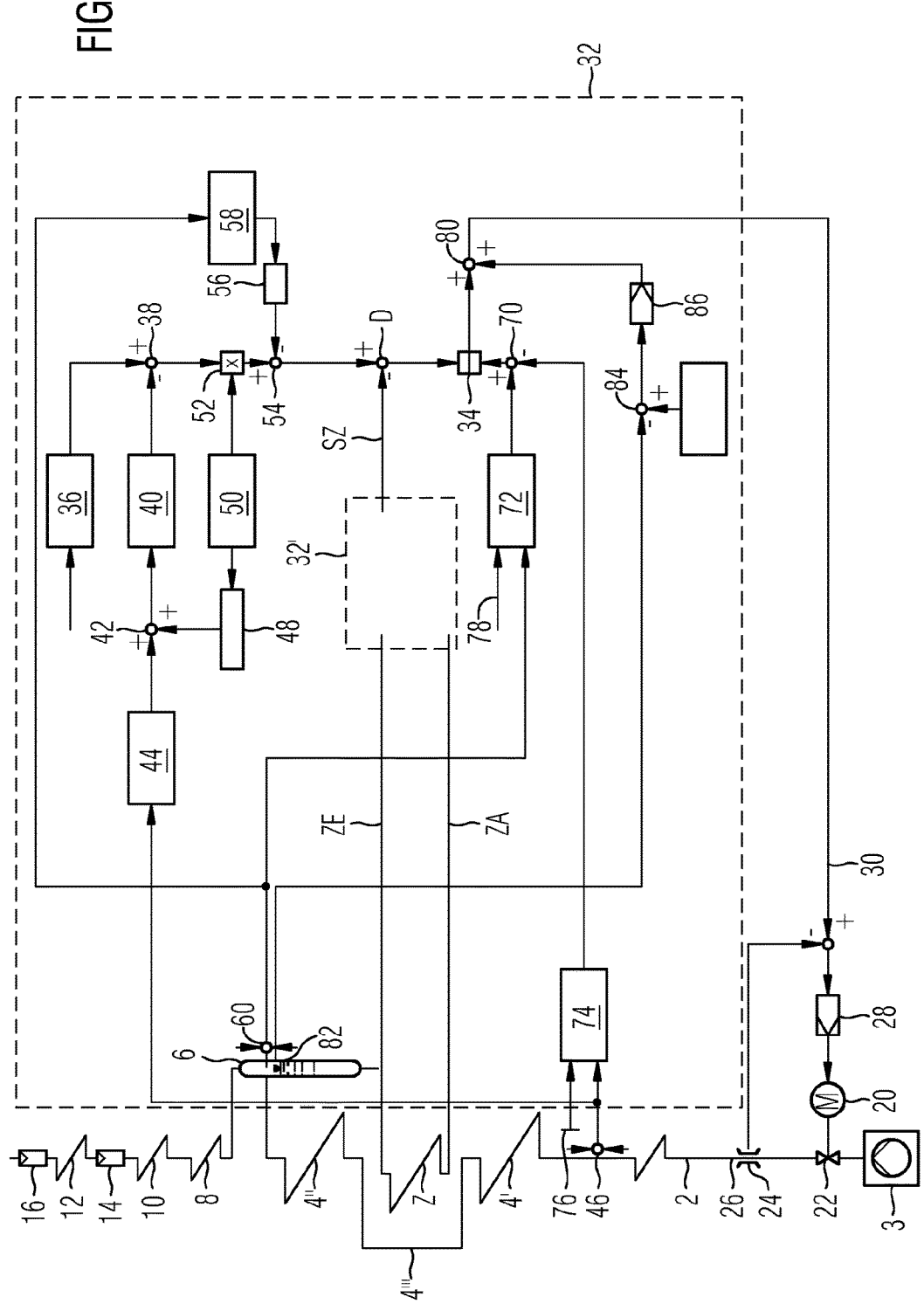
FIG. 2 schematically shows the refinement according to the invention of the control method, FIG. 3 schematically shows one configuration of the refinement according to the invention of the control method.

FIG. 2 now represents the refinement according to the invention of the arrangement and control known from WO 2009/068446 A2 and shown in FIG. 1. The heating surface 4 represented previously in FIG. 1 is replaced here with a heating surface assembly consisting of a first evaporator heating surface 4' and a second evaporator heating surface 4", which are connected to one another on the flow medium side via a connecting line 4'''. In the present exemplary embodiment, only a single intermediate heating surface Z, through which the flow medium also flows, is arranged in the flue gas channel between the two evaporator heating surfaces 4' and 4". The intermediate heating surface Z may in this case be an additional economizer heating surface, through which feed water flows also as a flow medium as with the economizer 2. An additional control unit 32' having additional measuring devices—not represented in detail here—in the region of the inlet tube ZE and the outlet tube ZA of the intermediate heating surface Z determines the temperature and/or pressure values in these regions, so as to determine a heat balance of this intermediate heating surface Z. The output signal SZ of the control unit 32' is then incorporated at a suitable position into the existing feed water flow control 32. In the present exemplary embodiment, the incorporation is carried out via an additional subtractor element D, which is inserted between the subtractor element 54 and the divider element 34. In this case, the output signal, which represents a characteristic value for the heat absorption of the intermediate heating surface Z, is subtracted by means of this additional subtractor element D from the output signal of the subtractor element 54, which represents the characteristic value characteristic heat power to be released to the flow medium in the evaporator 4, before it is sent as an input signal to the divider element 34. The balanced heat absorption of the evaporator heating surfaces 4' and 4" of the evaporator can therefore be reduced by the heat absorption of the interposed intermediate heating surface Z, and a setpoint value for the feed water mass flow rate which is adapted to the specific heating surface arrangement can thus be defined.

Figure 3:
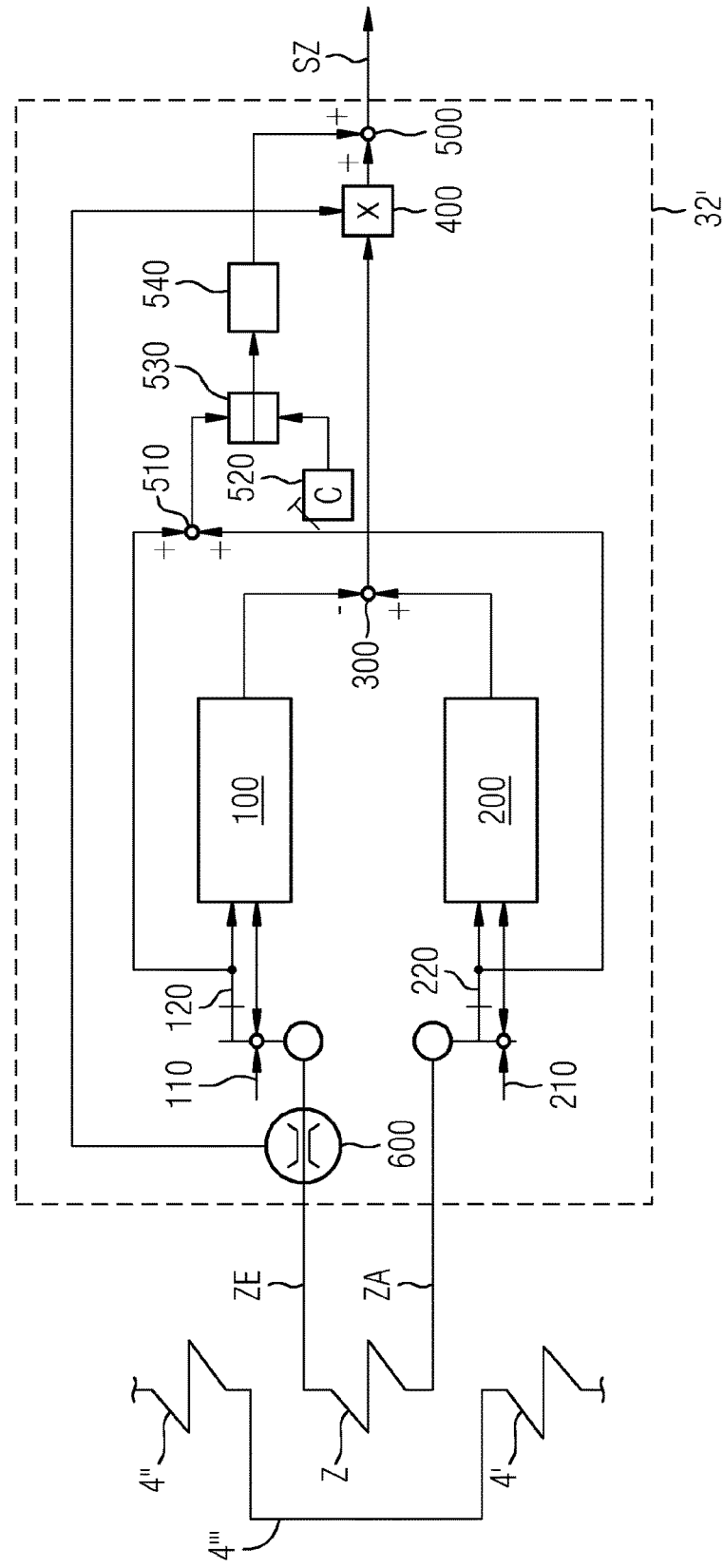

FIG. 3 shows a specific embodiment of the additional control unit 32' indicated in FIG. 2, in which balancing of the additional intermediate heating surface Z is sought on the flow medium side. For this, the enthalpy on the flow medium side is to be determined at the inlet and outlet of the interposed heating surfaces 4' and 4". This is advantageously done by converting the parameters of pressure and temperature at these positions, measured by means of pressure sensors 110, 210 and temperature sensors 120, 220. Because the interposed intermediate heating surfaces Z are generally additional economizer heating surfaces, the flow medium flowing through the intermediate heating surface Z will be a single-phase fluid. In the respective functional modules 100 and 200, the corresponding inlet and outlet enthalpy of the intermediate heating surface Z is then determined with the aid of the respective parameters. Because the enthalpy difference between the outlet and inlet, calculated by means of the subtractor element 300, is then multiplied in a multiplier element 400 by a measured mass flow rate 600 of the flow medium, the heat absorption of the flow medium in the interposed intermediate heating surface Z is known. This heat absorption corresponds to the flue gas cooling at the interposed intermediate heating surface Z, and is therefore no longer available to the evaporator heating surfaces 4' and 4" of the evaporator, and is accordingly to be subtracted from the balanced evaporator heat input.

In this case, it is in addition also to be taken into account that, in the event of changes in the material temperature of the interposed heating surfaces, thermal absorption and release effects of the tube wall also need to be taken into account. If the tube wall temperature increases over time, for example, then part of the heat released by the flue gas to the intermediate heating surface enters not the flow medium but only the tube wall, and increases the temperature of the latter. In relation to the amount of heat of the interposed heating surface, as determined from the balance on the flow medium side, the flue gas has released a greater amount of heat, which is then no longer available to the evaporator heating surface. In the event of a temperature decrease of the tube material of the interposed heating surface, the converse applies. The amounts of heat introduced into the tube wall or extracted therefrom because of thermal storage effects should therefore be taken into account for calculating the flue gas heat given off, which is no longer available to the evaporator heating surface. In order to calculate the amounts of heat absorbed and released, a correction value is therefore advantageously to be determined, which is to be determined on the basis of the change in a suitable temperature characteristic value of the interposed intermediate heating surface Z. For the sake of simplicity, this is generally done by means of a first-order differentiating element 540. The input signal of this differentiating element may generally be determined with the aid of additional measurements or on the basis of forming the average value of the existing temperatures at the inlet and outlet, or alternatively on the basis of additional information from, for example thermodynamic recalculations, etc.

In FIG. 3, the input signal of the differentiating element 540 is formed using the arithmetic mean of the two measured temperature characteristic values 120 and 220. To this end, the two temperature characteristic values 120 and 220 are summed in the adder 510 and divided in the following division element 530 by the constant c (provided by the constant element 520). For the use of this arithmetic mean, a linear temperature profile along the flow path in the tubes of the intermediate heating surface is presupposed, so that it may be assumed that the temperature characteristic value formed in this way sufficiently accurately captures changes in the material temperature of the intermediate heating surface during dynamic processes. These changes are then correspondingly evaluated by means of the differentiating element 540 in relation to absorbed and released thermal energy, which means that the differentiating element 540 must be parameterized with a suitable time constant and gain.

The refinement according to the invention of the control method, as described above with the aid of FIGS. 1 to 3 with the aid of an embodiment, may also be applied to the other embodiments of WO 2009/068446 A2 and WO 2009/150055 A2. In their entire disclosure, the latter are therefore intended to be included by the present invention, and therefore jointly incorporated (incorporation by reference).

The invention claimed is:

1. A control method for operating a heat recovery steam generator having a flue gas channel in which an evaporator, having at least two evaporator heating surfaces arranged successively in the flue gas channel and at least one intermediate heating surface arranged between the evaporator heating surfaces, is provided, the method comprising:

determining a characteristic value characteristic of the heat absorption in the evaporator for the evaporator heating surfaces, additionally determining for the at least one intermediate heating surface, an additional characteristic value for the heat absorption of the intermediate heating surface, subtracting this additional characteristic value for the at least one intermediate heating surface from the characteristic value characteristic of the heat absorption in the evaporator to obtain a corrected value, and controlling via a control unit a feed water mass flow rate or a feed water quantity of the heat recovery steam generator based on the corrected value.

2. The control method as claimed in claim 1, wherein the heat absorption of the at least one intermediate heating surface is determined with the aid of parameters of the flue gas in the region of an inlet tube and an outlet tube of the intermediate heating surface.

3. The control method as claimed in claim 1, wherein the heat absorption of the at least one intermediate heating surface is determined with the aid of parameters of a flow medium, which flows through the intermediate heating surface, in the region of an inlet tube and an outlet tube of the intermediate heating surface.

* * * * *